Patented Jan. 31, 1950

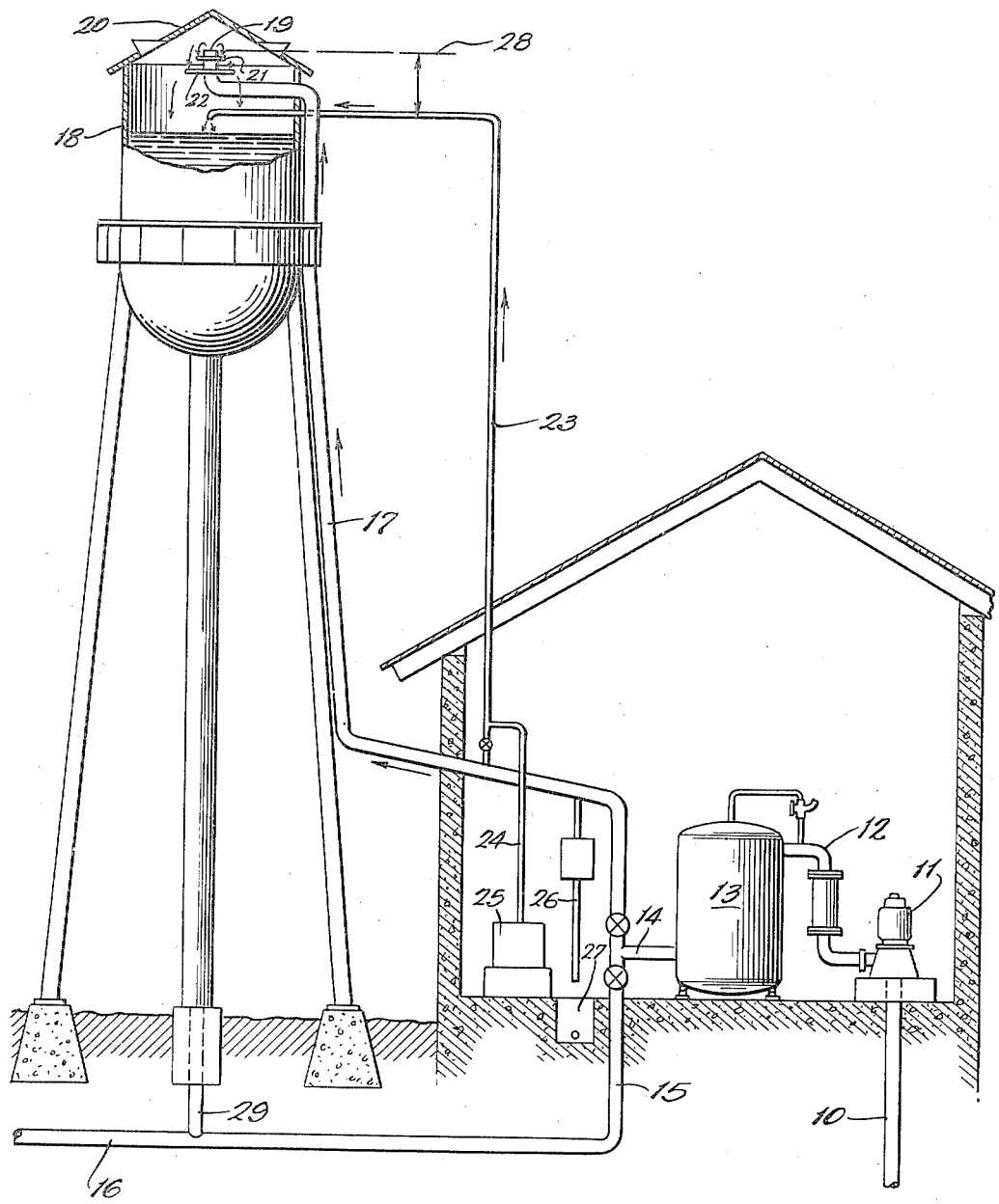

2,495,937

UNITED STATES PATENT OFFICE 2,495,937

WATER-TREATING PROCESS AND APPARATUS

Joseph P. Lawlor, Ames, Iowa

Application November 5, 1947, Serial No. 784,143

4 Claims. (Cl. 210—16)

This invention relates to a water-treating process and apparatus. The invention is particularly useful in the stabilization or sterilization of water as in the treating of municipal water supplies, household supplies, plant supplies, etc.

It has long been the practice to treat water obtained from wells or other sources and supplied to municipalities, the treatment being in the nature of adding chemicals to the water for sterilizing or stabilizing the water. My United States Patent No. 2,128,617 is illustrative of a method and means for treating municipal water supplies, etc., and is illustrative of a practice which has been employed for many years. The patent describes the aeration of water in the top of an elevated tank after the water has passed through softeners or filters, etc. The purpose of the aeration is to remove gases which are in solution in underground water, such gases including carbon dioxide, hydrogen sulphide, methane, etc.

It has been the practice to stabilize water by the introduction of such chemicals as caustic soda (sodium hydroxide), or soda ash. Raw water generally has a pH ranging from 6.5 to 7.5. If the pH of the water is permitted to remain low (7.0 for filtered water and 7.5 for zeolite softened water), there is a tendency for such water to become aggressive when pumped into the mains. "Aggressive" water is water that will have a tendency to dissolve iron in the pipes. By raising the pH of the softened water to about 8.0, the aggressiveness is greatly reduced and the water is better stabilized. As pointed out above, the introduction of caustic soda, soda ash, etc., has heretofore been employed for the stabilizing of the water with or without aeration, after a filtering or zeolite water softening operation.

Suppose, for example, a well water is to be softened by a zeolite water softener, and that the untreated water contains 60 parts per million of free $CO_2$ gas. The zeolite softened water would contain substantially the same amount of free $CO_2$. If, however, this free $CO_2$ is permitted to remain in the softened water, and pumped into the city water distribution system, the pH of the softened water would be less than 7.6 and the water would be aggressive in dissolving iron from the inside walls of the iron pipe lines, resulting in "red water" and, eventually, corroded-out pipes, boilers, etc. It is therefore necessary to remove the free $CO_2$. This is generally accomplished by either exposing the water to surface aeration or introducing a sufficient amount of caustic soda (NaOH) to take up all of the free $CO_2$, or by employment of both aeration and chemical feed to remove 60 p. p. m. of free $CO_2$ requires approximately 60 p. p. m. of NaOH.

U. S. Patent No. 2,128,617 functions as a means of releasing dissolved gases by surface aeration in the top of an elevated tank, after filtering or softening. My present invention is an improvement on U. S. Patent No. 2,128,617 in that it introduces a chemical into the top of an elevated tank after surface aeration in the top of the elevated tank has eliminated a considerable amount of dissolved gases as described in the above patent. Stabilization of the treated water by chlorination is also more effective and economical if the chlorine is introduced in the top of the elevated tank after aeration.

If the chlorine is introduced into the water prior to aeration, there is a loss of chlorine into the atmosphere during the aeration process.

A further advantage in the introduction of chlorine into the top of the elevated tank lies in the fact that the chlorinated water will then have a four to ten hour detention period prior to its being consumed. Public health offices generally regard it advisable to permit chlorinated water to stand for about two hours, prior to drinking, thereby allowing the chlorine ample time to destroy all the dangerous bacteria that may exist in the water supply.

Therefore by the use of U. S. Patent No. 2,128,617, to remove dissolved gases and introducing the chlorine into the top of the elevated tank directly after aeration, two desirable features are accomplished; namely (1) chlorine is not lost to atmosphere during aeration and (2) the already existing elevated tank is utilized as a detention tank, thereby allowing the chlorine ample time to destroy dangerous bacteria.

If the treating chemicals are added to the water after aeration rather than before aeration, surprisingly better results are obtained. In the first place, the amount of treating chemicals employed is sharply reduced. In the second place, the amount of salts in the treated water is reduced and a better water product is obtained. Further, better results are obtained within a shorter period of time.

An object of the invention is to provide a process and means whereby chemical treatment of water can be effected with a reduced amount of chemicals. A still further object is to provide a new process and apparatus highly effective for the introduction of the chemicals into the water body after filtering or zeolite softening and aeration and while utilizing a portion of the water stream going to the tower. Yet another object is to provide apparatus in which a chemical feeder riser is employed in conjunction with a water riser, a head being maintained between the two to bring out effective draining of the chemical feeder lines while the water riser is being drained. Other specific objects and advantages will appear as the specification proceeds.

The invention is illustrated in one embodiment, by the accompanying drawing, in which there is given a diagrammatical showing in vertical section of apparatus embodying my invention and with respect to which my improved process may effectively be carried out. It will be understood that the process is, however, not limited to the use of the apparatus shown.

In the illustration given, the most water is indicated as coming through pipe 10, from a well or any other source, to the pump 11. The water is pumped through pipe 12 to the filter 13, and from the filter 3 passes out through pipe 14. The water may be diverted through the valve-control pipe 15 to the water main 16, or it may be diverted through the separate riser 17 leading to the top of the tank 18. The riser 17 extends into the upper open part of tank 18 and has its open end 19 just below the roof 20 of the tank. Splasher disks 21 and 22 may be supported below the open end of the pipe 19. With this apparatus, water is discharged upwardly and falls down then upon the annular plates 21 and 22 to break up the water body and bring about an aeration of the water.

A chemical feeder line or riser 23 leads from the pipe 17 and extends upwardly and then inwardly so as to feed into the tank just above the water level, as illustrated in the drawing. Leading into the small riser 23 is a chemical feeder line 24 from the chemical supply tank 25. The riser 17 is provided with a drain pipe 26 provided with suitable valve-control means and discharging into a sump 27.

As illustrated in the drawing, it will be noted that there is a differential between the upper discharge end 19 of the riser 17 above the horizontal portion of the chemical riser 23, the differential being indicated by the line 28 shown in the drawing. The differential is about two feet. It is important that there be a sufficient head of water thus to provide means for clearing the chemical lines 23 and 24 when the drain pipe 26 is opened.

The chemical stored in the tank 25 may be a solution of caustic soda, soda ash, chlorine, or any other desired material employed for sterilizing or stabilizing the water.

Operation

In the operation of the apparatus and process, raw water is forced through the filter or softener 13 and thence through the outlet pipe 14 into riser 17. Preferably, the valve controlling the lower pipe 15 will be closed. Water rises through the pipe 17 and is aerated in the upper portion of the tank 18. The aeration removes the bulk of the carbon dioxide, hydrogen sulphide, methane, etc. and slightly increases the pH of the water. The small stream drawn through the riser 23 carries the desired proportion of chemical from tank 25 into the tank and discharges it upon the aerated body of water. Here the chemical meets water which contains less of the gases, and the reaction between the chemical and water is, therefore, less per cubic foot of water. The water is raised to the desired pH while using a substantially smaller amount of chemical than would be necessary if the chemical were issued directly into the riser 17 (before aeration).

The treated water is drawn off through the downwardly-extending pipe 29 where it joins the water main 16.

In the winter time when it becomes necessary to drain the riser 17, it is found that the draining of the water effectively clears the chemical feeder lines 23 and 24, such clearing of the pipe being rendered effective by virtue of the head of water in the riser 17 above the horizontal portion of the chemical feeder line 23.

By way of illustration, the following may be set out:

Raw water, having a total hardness of 25 grains per gram, a $CO_2$ content of 40 parts per million, an iron content of 2 parts per million, and a pH of 7.1, was found to have, after the aeration step in the tank, the same total hardness and the same iron content. However, the $CO_2$ content was reduced to 10 parts per million and the pH was raised to 7.3. After the introduction of caustic soda, the $CO_2$ content was reduced to zero and the pH increased to 8.1. If the chemical had been introduced before aeration, it will be noted that a considerable quantity of the caustic soda would be wasted by reason of its reaction with the large amount of $CO_2$ in the water prior to aeration.

In a similar operation in which chlorine was added through the separate feeder line 23, it was found that the quantity of chlorine required to give the same degree of sterilization was considerably reduced. The test as to chlorine disclosed that there was a definite loss of chlorine during aeration. This loss was not experienced when the chlorine was introduced into the water body after aeration.

In a closed filter or softener system, the free $CO_2$ in the water is generally eliminated by adding enough caustic soda or soda ash to react with the $CO_2$ and raise the pH. The pH is generally not raised above around 7.6 until after all of the $CO_2$ has been eliminated by chemical reaction with the caustic soda. In the present process, where the water is aerated prior to the introduction of caustic soda, much of the $CO_2$ is eliminated, thereby requiring substantially less caustic soda to bring the pH up to the desired point. The present invention avoids that loss of chemical which has heretofore been experienced by reason of the traveling of the water and chemical through the water riser up to the top of the tank and before aeration.

The process herein described is effectively employed in conjunction with water-treating systems, in which filters for iron removal are employed and in which zeolite for removing iron and softening water is employed. In each of these operations, whether operated separately or in tandem, the addition of the chemical after aeration results in bringing the pH to the desired point by the use of less chemical, or the sterilization of the water to the desired degree with less chemical, and, further, the elimination of the undesired gases by the use of less chemical.

The treated water, containing as high as 35 or 40 parts per million of $CO_2$, is found to have in the neighborhood of only 10 parts per million of $CO_2$ after the aeration step. Comparable results are obtained for the other gases. The water is, therefore, effectively treated with a substantially smaller amount of chemical, while at the same time there are less salts present resulting from the reaction by the chemical and reacting material in the water, and therefore a better water product is produced.

While in the foregoing specification I have set out certain steps in considerable detail and have shown details of apparatus, it will be understood that the details of procedure and apparatus given may be varied widely by those skilled in the art without departing from the spirit of my invention.

I claim:

1. In a process for treating water, the steps of maintaining a large pool of water in an elevated position, withdrawing water from the bottom of said pool in a restricted stream, dividing a water stream into a major and minor stream and forcing both streams toward the upper portion of said pool, aerating the major stream above the pool to cause the aerated water to fall into said pool, introducing a treating chemical into the minor stream, and discharging it upon said pool of water.

2. In a process for treating water, the steps of maintaining a large pool of water in an elevated position, withdrawing water from the bottom of said pool in a small restricted stream, dividing an incoming water stream into a major and minor stream and directing both above said pool, aerating the major stream to cause the aerated water to collect in said pool, introducing a treating chemical into the minor stream, and spraying the minor stream upon the surface of said pool.

3. In a process for treating water flowing in a single stream, the steps of dividing said stream into a major and minor stream, aerating the major stream at an elevated point, collecting the aerated water in a large pool maintained in an elevated position, introducing a treating chemical into the minor stream, discharging the minor stream into the top portion of said pool, and withdrawing a small stream of water from the bottom portion of said pool.

4. In apparatus of the character set forth, a tank, means for supporting said tank at an elevation, a riser for conducting water upwardly into the space above said tank and for discharging water thereinto to aerate the same, a second pipe leading from said riser and communicating with said tank below the top of said riser, means for introducing a chemical reagent in said second pipe, the discharge point of said riser being spaced above the discharge end of said second pipe by at least two feet to provide a differential head therebetween, and a valve-controlled outlet for said riser below the point of junction between said second pipe and said riser for automatically draining said second pipe when said riser is drained.

JOSEPH P. LAWLOR.

REFERENCES CITED

The following references are of record in the file of this patent:

UNITED STATES PATENTS

| Number | Name | Date |
|---|---|---|
| 213,689 | E. J. Desroches | May 25, 1943 |
| 831,873 | Julian | Sept. 25, 1906 |
| 1,912,334 | Plet | May 30, 1933 |
| 2,034,460 | Darcey | Mar. 17, 1936 |
| 2,128,617 | Lawlor | Aug. 30, 1938 |
| 2,144,051 | Frankforter | Jan. 17, 1939 |
| 2,247,762 | McCoy | July 1, 1941 |
| 2,287,284 | Behrman | June 23, 1942 |
| 2,325,679 | Hughes | Aug. 3, 1943 |
| 2,330,008 | Robinson | Sept. 21, 1943 |
| 2,382,490 | Lawlor | Aug. 14, 1945 |